United States Patent [19]

Keeble et al.

[11] Patent Number: 5,343,286
[45] Date of Patent: Aug. 30, 1994

[54] OTDR HAVING OPTICALLY SWITCHED AMPLIFIED OUTPUT ONTO TEST FIBRE TO SUPPRESS OPTICAL AMPLIFIER NOISE BETWEEN OTDR PLUSES

[75] Inventors: Peter J. Keeble; Christopher J. Rowe, both of Ipswich; David M. Spirit, Woodbridge, all of England

[73] Assignee: British Telecommunications public limited company, London, England

[21] Appl. No.: 938,218

[22] PCT Filed: Feb. 6, 1991
    PCT No.: PCT/GB91/00183

[86] § 371 Date: Oct. 14, 1992
    § 102(e) Date: Oct. 14, 1992

[87] PCT Pub. No.: WO91/12509
    PCT Pub. Date: Aug. 22, 1991

[30] Foreign Application Priority Data

Feb. 15, 1990 [GB] United Kingdom ............... 9003441
Sep. 10, 1990 [GB] United Kingdom ............... 9019764

[51] Int. Cl.⁵ .............................................. G01N 21/88
[52] U.S. Cl. ..................................................... 356/73.1
[58] Field of Search ........................................ 356/73.1

[56] References Cited

U.S. PATENT DOCUMENTS

| | | | |
|---|---|---|---|
| 4,561,119 | 12/1985 | Epworth . | |
| 4,632,544 | 12/1986 | Form | 356/73.1 |
| 4,794,249 | 12/1988 | Beckmann et al. | 356/73.1 |
| 4,826,314 | 5/1989 | Comte | 356/73.1 |
| 4,859,015 | 8/1989 | Krinsky et al. | 372/19 X |
| 4,899,043 | 2/1990 | Mochizuki et al. | 356/73.1 X |
| 4,906,949 | 3/1990 | Pocholle et al. | 374/162 X |
| 4,938,556 | 7/1990 | Digonnet et al. | 372/6 X |
| 5,013,907 | 5/1991 | Bateman | 356/73.1 X |
| 5,028,775 | 7/1991 | Furukawa et al. | 356/73.1 X |

FOREIGN PATENT DOCUMENTS

| | | |
|---|---|---|
| 0186299 | 7/1986 | European Pat. Off. . |
| 1-142435 | 6/1989 | Japan . |
| 2-44225 | 2/1990 | Japan .................... 356/73.1 |
| 2175766A | 12/1986 | United Kingdom . |
| 2182222A | 5/1987 | United Kingdom . |

OTHER PUBLICATIONS

Photonics, Fiber Optic Trends, "Fiber Lasers: New Interest in an Old Technology:" by Chris Emslie, Apr. 1989, pp. 103–104 106–108.
Electronics Letters, "250 km Nonrepeated Transmission Experiment at 1.8 Gb/s Using LD Pumped $Er^{3+}$ Doped Fibre Amplifiers in IM/Direct Detection System", May 11, 1989, vol. 25, No. 10, pp. 662–664.
Tamura et al, "Fiber Raman Amplifier Module with Semiconductor Laser Pump SOurce", OKI Electric Industry Co., Ltd. Optical Transmission Systems Eng. Dept. 4–10–16 Shibaura, Minato-ku, Tokyo, pp. 62–65, 1987.
Spirit et al "Raman-Assisted Long-Distance Optical Time Domain Reflectometry", Electronics Letters, Dec. 7, 1989, vol. 25 No. 25, pp. 1687–1688.
Patent abs. of Japan, vol. 10, No. 215 (P-481)(2271), Jul. 26, 1986, JP,A,6154421 (Nippon T&T corp) Mar. 18, 1986. (Suzuki).
Patent abs of Japan, vol. 7, No. 90, (R191)(1235) Apr. 14, 1983, JP,A, 5818138) Fujitsu K.K.) Feb. 2, 1983.

*Primary Examiner*—Vincent P. McGraw
*Attorney, Agent, or Firm*—Nixon & Vanderhye

[57] ABSTRACT

An optical test apparatus includes an optical time domain reflectometer for launching light pulses into a test fibre. An optical amplifier is provided in the light path between the optical time domain reflectometer and the test fibre or amplifying the light pulses. An optical switch is positioned in the light path between the amplifier and the test fibre for preventing light reaching the test fibre between the light pulses launched by the OTDR. Timing structure is provided for synchronising the operation of the optical switch so as to open the switch as a light pulse reaches the switch and close the switch as a light pulse leaves the switch.

26 Claims, 3 Drawing Sheets

OTDR HAVING OPTICALLY SWITCHED AMPLIFIED OUTPUT ONTO TEST FIBRE TO SUPPRESS OPTICAL AMPLIFIER NOISE BETWEEN OTDR PLUSES

RELATED APPLICATIONS

This application is related to the commonly assigned copending application of Blank et al, Ser. No. 07/541,973 filed Jun. 22, 1990.

BACKGROUND OF THE INVENTION

1. Field of the Invention

This invention relates to optical test apparatus, and in particular to apparatus for detecting and monitoring losses and/or faults in optical fibres.

2. Related Art

It is well known that faults in optical fibres can be located by an optical time domain reflectometer (OTDR). An OTDR launches a pulse of light into a fibre, and backscattered light is monitored for abrupt changes indicative of a loss or fault. The distance of the loss or fault from the launch end of the fibre can be determined from the time interval between launch and return of the backscattered peak. Once a period of time sufficient to receive all detectable backscattered light has passed, a further pulse may be launched into the fibre. The pulse width may be varied for different dynamic range or resolution requirements. Thus, for a given amplitude, an increase in the pulse width enables a greater length of fibre to be monitored, that is to say it increases the dynamic range of the OTDR. The dynamic range of an OTDR is the loss after which an event, backscatter or reflection can still be detected.

The OTDR is, therefore, an extremely useful item optical test equipment; since, from connection to a single end of an optical fibre network, the location of losses and reflections can be determined, and their amplitude measured, to a high degree of accuracy. For loss measurements, both point losses and end-to-end fibre or network losses can be measured. In duplex networks, the amplitude of any reflections is important, since these may cause crosstalk. Using wavelength division multiplexing (WDM) techniques, it is also possible to take these measurements at a particular wavelength whilst the network is carrying data at another wavelength.

Until recently, high dynamic range OTDRs have primarily been required for use on long (>75 km) submarine systems. In order to achieve the dynamic range required, the width of the output pulse is increased so that more power is launched into the fibre. This has the effect of reducing the spatial resolution (that is to say the minimum distance between which events can be distinguished). Typically, a 10 μs pulse would result in a splice loss appearing 2 km in length. For long-haul systems, where events are few and far between, this resolution is sufficient.

With the advent of Passive Optical Networks (PONs) which are short (<10 km) in length, but high in loss (25 dB), a requirement for a high resolution (<10 m), high dynamic range (>25 dB backscatter), OTDR is apparent. Currently available OTDRs which have the necessary spatial resolution fall short on dynamic range. Thus the Ando 7110C, with a 50 ns pulse width (10 m resolution), has a backscatter dynamic range of 15 dB; and the Anritsu 910C, with a 100 ns pulse width (20 m resolution), has a backscatter dynamic range of 18 dB. It should be noted that these dynamic range figures are obtained by measuring the loss of the fibre which can be seen from the point nearest to the OTDR to the point where the peak of the noise floor is reached after about 10 minutes of trace averaging. In practice, depending on the measurement to be taken, the usable dynamic range may be up to 3 dB less.

SUMMARY OF THE INVENTION

The present invention provides an optical test apparatus comprising an optical time domain reflectometer for launching light pulses into a test fibre, an optical amplifier in the light path between the optical time domain reflectometer and the test fibre for amplifying the light pulses, an optical switch positioned in said light path, and timing means for synchronising the operation of the optical switch so as substantially to prevent light reaching the test fibre between the light pulses launched by the OTDR.

An OTDR can launch successive single pulses or successive bit-streams into a fibre for backscattering monitoring, and the term "light pulses" as used in this specification should be taken to include both of these possibilities.

The optical amplifier may be a fibre amplifier or may be constituted by first and second fibre amplifiers in series.

In a preferred embodiment, the or each fibre amplifier is constituted by a length of doped optical fibre and a pump laser, the pump laser being connected to the length of doped optical fibre via a wavelength division multiplex coupler. Advantageously, the output of the or each pump laser is centred on 1,490 nm.

The optical switch is effective to prevent power from spontaneous emissions and the pump laser(s) reaching the test fibre at times other than when the OTDR is launching a pulse.

In another preferred embodiment, the first fibre amplifier, which is adjacent to the optical time domain reflectometer, is constituted by a length of erbium-doped optical fibre and a pump laser, the pump laser being connected to the length of erbium-doped optical fibre via a wavelength division multiplex coupler; and the second fibre amplifier is constituted by a length of erbium-doped optical fibre and two pump lasers, the pump lasers being connected to opposite ends of the length of erbium-doped optical fibre via respective wavelength division multiplex couplers. Advantageously, the output of each of the pump lasers is centred on 1,490 nm, the power of the pump laser associated with the first fibre amplifier is 25 mW, and the power of each of the two pump lasers associated with the second fibre amplifier is 55 mW.

Preferably, the erbium-doped optical fibre of the first fibre amplifier has a length of 17 m, a core diameter of 5 μm and a doping level of 1100 ppm; and the erbium-doped optical fibre of the second fibre amplifier has a length of 23 m, a core diameter of 6 μm and a doping level of 1100 ppm.

A lithium niobate switch may be positioned in the light path between the two fibre amplifiers.

Preferably, the or each fibre amplifier is associated with a respective optical isolator.

In a preferred embodiment, the optical switch is an acousto-optic switch and is positioned in the light path between the optical amplifier and the test fibre. Conveniently, the acousto-optic switch is driven by a radio frequency driver whose output frequency is such as to set up an acoustic wave in the switch. Alternatively, the optical switch is a laser amplifier, preferably a multiple quantum well device. In this case, the laser amplifier may constitute the optical amplifier as well as the optical switch.

Preferably, the timing means includes a square wave generator and a pulse generator. Where the optical switch and the optical amplifier are separate items, the square wave generator and the pulse generator may be positioned between the optical time domain reflectometer and the optical switch, the arrangement being such that the launching of a light pulse by the optical time domain reflectometer triggers the square wave generator to output a square wave, the trailing edge of which triggers the pulse generator which, in turn, triggers the optical switch, the period of the square wave being such as to match the delay between the launch of the light pulse by the optical time domain reflectometer and the arrival of that pulse at the optical switch, this delay being due to the presence of the optical amplifier. Where the optical switch is an acousto-optic switch, the square wave generator and the pulse generator are positioned between the optical time domain reflectometer and the radio frequency driver.

In another preferred embodiment, a respective timing means is provided for controlling the supply of current to the or each pump laser, whereby the or each pump laser operates substantially only when a light pulse is passing through the associated length of erbium-doped optical fibre, and the optical switch is constituted by the fibre amplifier(s). In this case, the or each timing means may include a square wave generator and a pulse generator, the or each timing means being such that the launching of a light pulse by the optical time domain reflectometer triggers the respective square wave generator to output a square wave, the trailing edge of which triggers the associated pulse generator which, in turn, triggers the supply of current to the associated pump laser, the period of the square wave being such as to match the delay between the launch of the light pulse by the optical time domain reflectometer and the arrival of that pulse at the associated length of erbium-doped optical fibre.

Advantageously, means are provided for continuously varying the width of the output pulse of the or each pulse generator, whereby the width of the light pulses launched into the test fibre can be continuously varied. Consequently, the pulse generator can be used to control the resolution of the apparatus. As this control is continuously variable, an optimum dynamic range/resolution trade-off can be obtained for the fibre under test.

The apparatus may further comprise a length of optical fibre positioned in the light path between the amplifier(s) and the acousto-optic switch, the length of said optical fibre being such as to provide a delay in the optical light path between the optical time domain reflectometer and the acousto-optic switch to compensate for electrical delays occurring in the electrical path from the optical time domain reflectometer to the radio frequency driver.

BRIEF DESCRIPTION OF THE DRAWINGS

An optical test apparatus constructed in accordance with the invention will now be described in greater detail, by way of example, with reference to the accompanying drawings, in which.

DETAILED DESCRIPTION OF PREFERRED EMBODIMENTS

Figure 1:
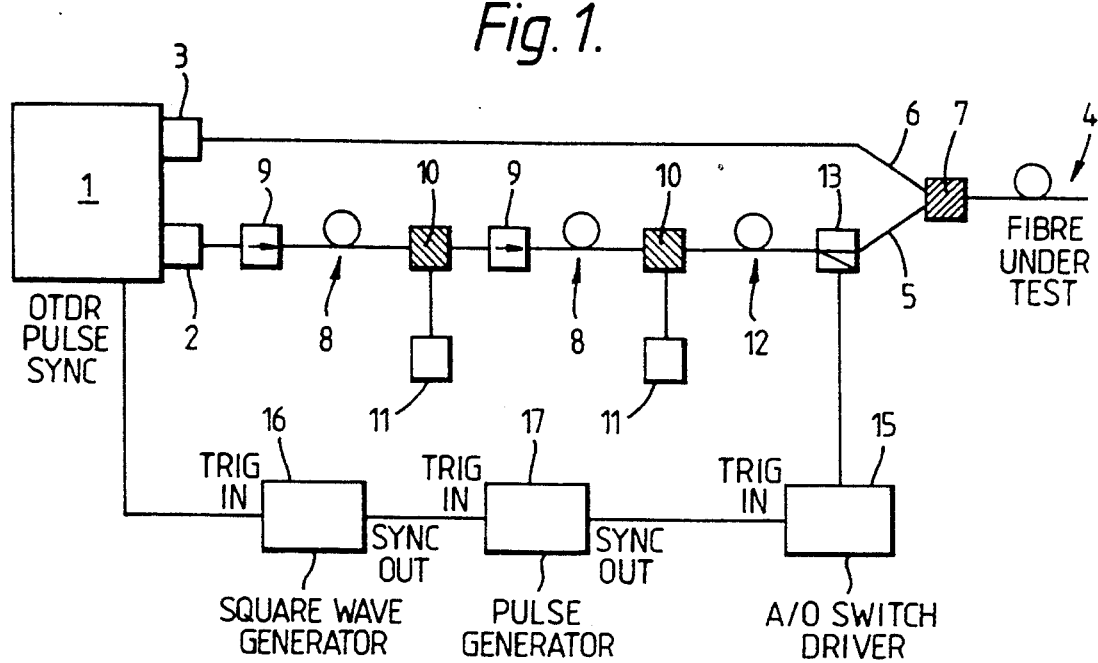
FIG. 1. is a schematic representation of the apparatus.

Referring to the drawings, FIG. 1 shows an Anritsu MW910C OTDR mainframe 1 with a 1550 nm MW939 plug-in unit. The plug-in unit of the OTDR 1 includes a Fabry-Perot laser 2 and an avalanche photodiode (APD) receiver 3. The OTDR 1 is basically unmodified, apart from minor changes which are necessary to gain access to the plug-in unit, and in particular to the laser 2 and the receiver 3. The laser 2 launches 40 ns or 100 ns pulses of light at 1550 nm into a length of fibre 4 under test, via a fibre branch line 5; and the receiver 3 monitors backscattered light from the test fibre, via a fibre branch line 6. The branch lines 5 and 6 are connected to the test fibre 4 by an optical coupler 7.

Figure 2:
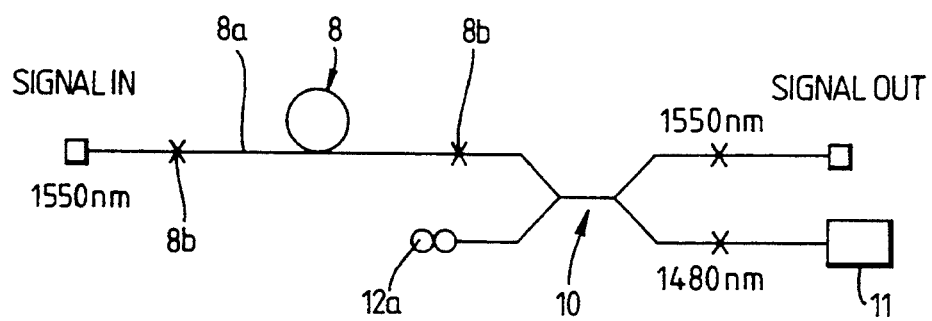
FIG. 2. is a schematic representation of a fibre amplifier forming part of the apparatus.

The branch line 5 includes a pair of fibre amplifiers 8, each of which is associated with an optical isolator 9 and, via a WDM coupler 10, a pump laser 11. The branch line 5 also includes, "downstream" of the amplifiers 8, a length of delay fibre 12 and an acousto-optic switch 13 which has a 30 dB extinction ratio. The switch 13 is constituted by a crystal the whose refractive index is altered as a result of mechanical strain accompanying the passage of an acoustic wave through the crystal. Such a switch is a very fast-acting switch. Each fibre amplifier 8 is constituted (see FIG. 2) by a length of erbium-doped fibre 8a which is coupled into the branch line 5 by splices 8b. The first erbium-doped fibre 8a has a length of 17 m, a core diameter of 5 $\mu$m and a doping level of 1100 ppm (BTRL Batch No. 398.004). The second erbium-doped fibre 8a has a length of 23 m, a core diameter of 6 $\mu$m and a doping level of 1100 ppm (BTRL Batch No. 309.201). Each WDM coupler 10 has four legs, two of which are spliced into the branch line 5, the pump laser 11 being connected to another leg of the WDM coupler, and the remaining leg of the WDM coupler having a termination 12a. In use, each pump laser 11 is maintained at a constant temperature of 19° C. by means of a Peltier cooler. The output of each pump laser 11 is centred on 1490 nm, which is the optimum pumping wavelength of the associated fibre amplifier 8. The optical isolator 9 "upstream" of the first amplifier 8 prevents power from the pump laser 11 reaching (and possibly damaging) the OTDR laser 2. The isolator 9 "upstream" of the second amplifier 8 prevents the amplified spontaneous emission (ASE) from this amplifier from partially saturating the first amplifier 8 which would reduce its gain. Each isolator 9 has a loss of approximately 2.5 dB. Super physical contact (PC) connectors are used to connect all the components of the branch line 5 together, and also to connect the coupler 7 to the test fibre 4. The super PC connectors are used to reduce reflections a minimum, thereby decreasing the risk of the amplifiers 8 lasing, and also reducing the reflection of transmitted OTDR pulses from the connector between the coupler 7 and the test fibre 4, which may saturate the receiver 3. Alternatively, and preferably, the PC connectors could be replaced by splices.

Figure 3:
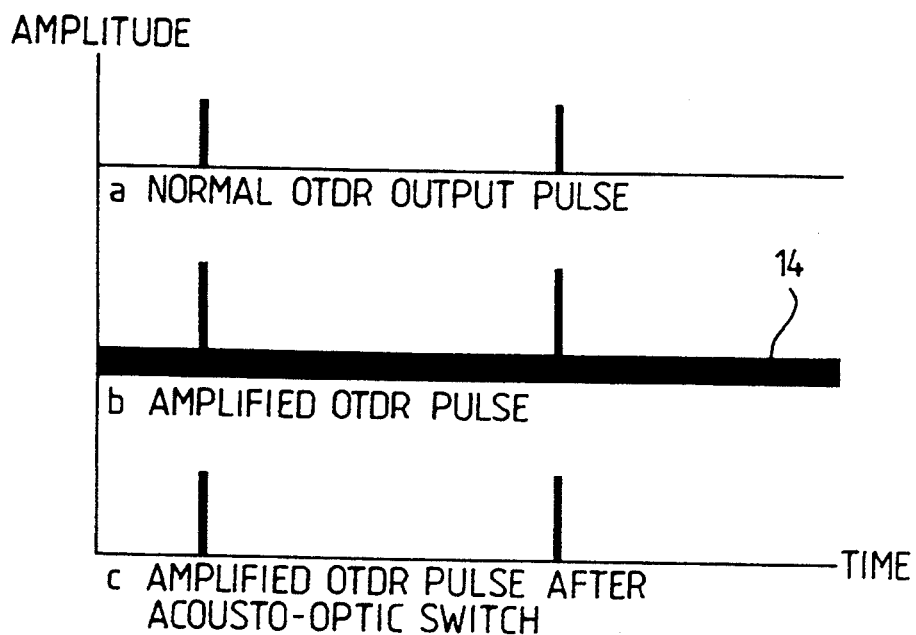
FIG. 3. is a graphical representation showing the effect of an acousto-optic switch forming part of the apparatus.

The acousto-optic switch 13 is effective to prevent ASE and pump laser power being launched into the test fibre 4 at times other than when the OTDR laser 2 is launching a pulse. The effect of the switch 13 is shown in FIG. 3. Thus, FIG. 3a shows the normal output of the OTDR 1, and FIG. 3b shows the normal amplified output, in which ASE and pump laser power give rise to a large amount of noise, indicated generally by the reference numeral 14. If the ASE and pump laser power were launched into the test fibre 4 between OTDR pulses at a sufficiently high level, backscattered noise would limit any increase in the dynamic range of the OTDR 1 which results from the increased power due to the amplification of the amplifiers 8, were it not for the effect of the acousto-optic switch 13. Indeed, as the power of the pump laser 11 is increased to give an increase in power transmitted into the test fibre 4, the noise level would, in the absence of the switch 13, increase to such a level as to saturate the receiver 3 of the OTDR 1 as shown in FIG. 3b and make it unusable. This noise problem is overcome, as shown in FIG. 3c, by ensuring that the switch 13 is timed to be open only so as to pass amplified pulses from the OTDR laser 2, and so as to be closed at all other times, thereby preventing all other emissions reaching the test fibre 4 in the intervening periods between the passage of amplified pulses. As spontaneous and pump laser emissions do not reach the test fibre 4 between OTDR pulses, the power of the transmitted pulses can be increased, whilst maintaining a narrow pulse width, thereby ensuring that the OTDR 1 has a high dynamic range and a good spatial resolution. This does mean, however, that the amplified pulses are composed of the OTDR laser spectrum, spontaneous emission and pump emission, but this does not matter as the spectrum of the output pulse is unimportant for OTDR purposes.

As mentioned above, the timing of the acousto-optic switch 13 is critical. The switch 13 is driven by its own radio frequency (RF) driver 15, which converts a transistor-transistor logic (TTL) input signal to a switched RF output whose frequency is such as to set up an acoustic wave in the switch. However, since the fibre amplifiers 8 introduce a delay into the arrival of a pulse at the switch 13, due to the time it takes for the light pulse to travel the length of each erbium-doped fibre 8a, the switch driver 15 cannot be directly coupled to the drive circuitry of the OTDR laser 2. Instead, as shown in FIG. 1, an output is taken from the OTDR laser 2 to trigger a square wave generator 16. This in turn triggers a pulse generator 17, whose output is connected to the driver 15 of the acousto-optic switch 13.

Figure 4:
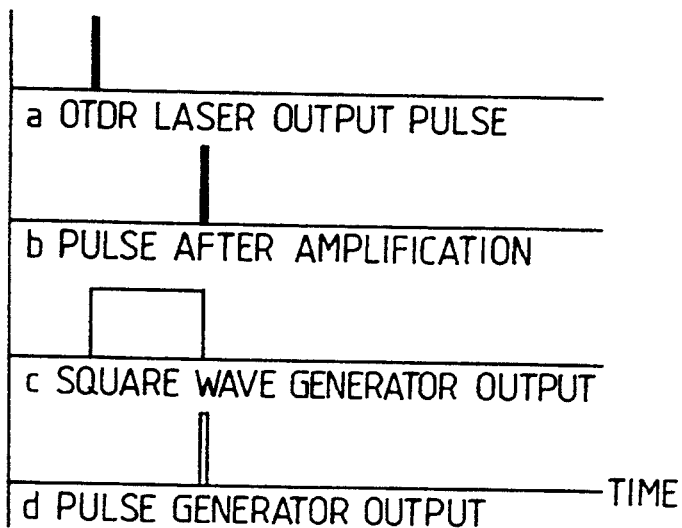
FIG. 4. is a graphical representation illustrating the timing of the acousto-optic switch.

FIG. 4 illustrates the switch timing sequence. Thus, an output pulse of the OTDR laser 2 (see FIG. 4a) triggers the square wave generator 16, the trailing edge of the output square wave (see FIG. 4c) of which is used to trigger the pulse generator 17 (see FIG. 4d). The output of the pulse generator 17 then triggers the switch 13 via the driver 15. By adjusting the period of the square wave, the delay between the OTDR laser pulse (see FIG. 4a) and the amplified pulse (see FIG. 4b) can, in theory, be matched. In practice, because of electrical delays in the switch path (that is to say the path from the OTDR laser 2 to the switch driver 15), matching is still not exact. This is the reason for the length of delay fibre 12 in the branch line 5. This delay fibre 12 has a length of a few hundred meters, which is sufficient to provide a delay in the optical signal path to compensate for electrical delays in the switch path. If necessary, the width of the output pulse of the pulse generator 17 can be adjusted to match (or be narrower than) the width of the amplified pulse. Consequently, the width of the output pulse, and hence the resolution of the OTDR 1, can be controlled by the switch 13. The only limiting factors here are the rise time of the switch 13, and the bandwidth of the receiver 3. Acousto-optic switches are available with rise times as low as a few nanoseconds which is adequate for a high resolution instrument. If necessary, the receiver 3 could also be changed to obtain the required bandwidth for high resolution operation.

In use, the laser 2 of the OTDR 1 emits a pulse with a peak output power of 14 dBm (25 mW). The dynamic range (without the amplification of the branch line 5) for pulse widths of 40 ns and 100 ns is 16 dB and 18 dB respectively (giving a spatial resolution of 20 m and 8 m respectively). However, by amplifying the pulses on the branch line 5, a pulse power of 27 dBm (500 mW) is launched into the fibre 4, and this 13 dB power increase should, in theory, result in a 6.5 dB increase in the dynamic range for each pulse width providing the noise at the receiver 3 is not increased, since the pulse will encounter the loss of the fibre twice, once in each direction. The measured dynamic range of the apparatus shown in FIG. 1 is 22.5 dB and 24.5 dB respectively for the 40 ns and 100 ns pulse widths (for which the spatial resolutions remain 20 m and 8 m respectively). Thus, the apparatus of the invention gives an increased dynamic range for an OTDR whilst maintaining high resolution.

Figure 5:
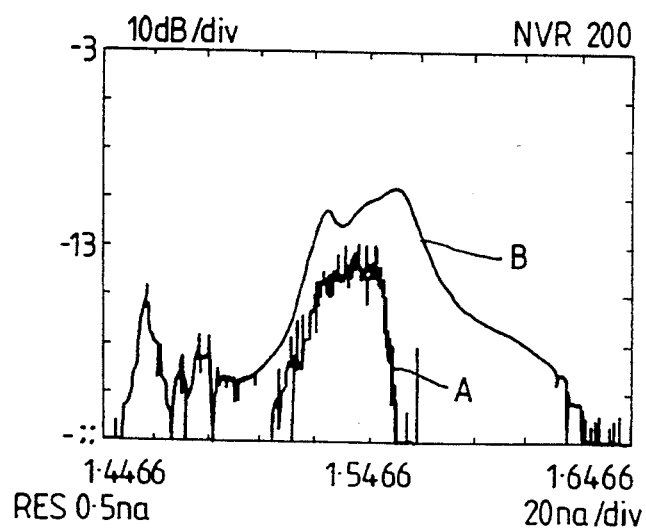
FIG. 5. is a graphical representation illustrating the spectrum of the OTDR laser forming part of the apparatus and the spectrum of the amplifier gain.

FIG. 5 is a comparison of the spectrum A of the laser 2 and the spectrum B of the gain of the amplifier constituted by the two fibre amplifiers 8. As will be apparent, the laser spectrum A (which has a broad spectral width of about 40 nm) lies entirely within the amplifier gain spectrum B. In other words, the gain characteristics of the amplifier are such that the entire output spectrum of the laser 2 is amplified. The use of the fibre amplifiers 8 thus permits the use of a relatively cheap Fabry-Perot laser. This is to be contrasted with known OTDRs whose amplifiers have narrow bandwidths, thereby requiring the use of expensive distributed feed back (DFB) lasers. Moreover, because the laser spectrum A lies well within the amplifier gain spectrum B, there is a wide tolerance of laser wavelengths that can be used. As it is difficult to manufacture a Fabry-Perot laser with a pre-determined output, this wavelength tolerance permits tolerances on the outputs of Fabry-Perot lasers to be accomodated, thereby permitting the use of cheaper Fabry-Perot lasers than would otherwise have been the case.

It will be apparent that modifications could be made to the apparatus described above. Thus, by increasing the power of the fibre amplifiers 8, the optical power launched into the test fibre 4 can be increased to about 33 dBm (2 W). Above this level, problems tend to arise if connectors are not kept spotlessly clean, so this is probably the highest practical launch power. To achieve such a launch power level, a peak amplifier output of 48 dBm (63 W) is required due to the losses (about 15 dB) in the optical components the delay fibre 12, (the acousto-optic switch 13, and the coupler 7) "downstream" of the amplifiers 8. It is, of course, possible to replace the fibre amplifiers 8 by a single fibre amplifier of a suitable rating, or to use three or more fibre amplifiers. It would also be possible to use one or more semiconductor amplifiers in place of the fibre amplifiers.

The apparatus described above could be further improved by using a receiver having a higher sensitivity. Two possibilities are to use photon counting techniques or an optical receiver having an integral pre-amplifier. Also, where narrower pulse widths are used to achieve a higher resolution, the receiver circuitry would need to be extensively revised to increase the bandwidth to that required. In this connection, two options exist to decrease the output pulse width. First, by using the acousto-optic switch 13, and second by modifying the pulse generation circuitry in the OTDR 1. To use the switch 13, the collimated beam entering the switch crystal would need to be focused, since the rise time of the switch is related to the time it takes the acoustic wave to traverse the beam. Where a 400 $\mu$m collimated beam is used, a rise time of about 20 ns results. If the beam were focused, then the rise time could be reduced to a few nanoseconds. This is required if the pulse is to be reduced to a period of less than 10 ns. Modifying the pulse generation circuitry is potentially a relatively simple task, though the bandwidth of the pulse amplification circuitry is unknown but likely to be too low. The problems of receiver and pulse generator bandwidth can, however, be overcome by using a specifically-designed, high resolution OTDR.

It would also be possible to alter the amplification properties of the fibre amplifiers 8 by varying the concentrations of erbium doping. The length of fibre 8$a$ used for these amplifiers 8 depends upon the power of the associated pump lasers 11, and can vary between 10 and 25 m for pump laser outputs varying between 15 and 90 mW. Similarly, the operating wavelength of each pump depends upon the properties of the fibre amplifier with which it is associated.

In a further modification, a filter could be positioned between the acousto-optic switch 13 and the coupler 7 to reduce pump power reaching the test fibre 4, and to narrow the spontaneous output of the fibre amplifiers 8. In this case, the Fabry-Perot laser 2 could be replaced by a DFB laser, if a very narrow spectral width output is required.

In a particularly advantageous modification, a lithium niobate switch, which operates on the Mach-Zehnder principle, is positioned in the branch line 5 between the two amplifiers 8. Timing and driver circuitry—similar to that used to time the switch 13 (i.e. a square wave generator, a pulse generator and a switch driver)—is provided to time the lithium niobate switch so that only amplified pulses are transmitted to the second amplifier. This is to prevent the ASE from the first amplifier causing population inversion in the second amplifier, which would reduce the pump energy stored and thus the gain which can be extracted. A third optical isolator may be provided between the second amplifier 8 and the acousto-optic switch 13, this isolator being effective to prevent the output of the second amplifier being reflected back into that amplifier, which would reduce its gain.

In this modified arrangement, the first amplifier is pumped (using a 25 mW pump laser) towards the source to minimise the ASE energy arriving at the second amplifier. The second amplifier is pumped bidirectionally, thereby improving its amplification. This bidirectional pumping is achieved by using two 55 mW pump lasers, one at each end of the associated fibre amplifier, each of the pump lasers being connected to the fibre amplifier via a respective WDM coupler. In this case, all three pump lasers are semiconductor laser diodes which operate at a wavelength of 1490 nm. For a pulse width of 100 ns, and a pulse repetition period of 1.6 ms, the OTDR has a distance range of 144 km. Without any input to the second amplifier, the mean ASE output (measured "upstream" of the acousto-optic switch 13) is 5 mW. This equates to a total energy output of 8 $\mu$J per repetition period. The energy contained in the amplified pulse—which has a peak optical power of 100 W (again measured "upstream" of the switch 13)—is 10 $\mu$J, which is comparable to the total ASE energy. This suggests that the gain of the second amplifier is just saturating. The insertion loss of the switch 13 and the coupler 7 reduce the peak optical power to 2 W (33 dBm). The dynamic range of the OTDR modified in this way is, therefore, theoretically 9.5 dB higher than the 18 dB of the "standard" OTDR (i.e. without the amplication in the branch line 5). In practice, however, coupler losses reduce the dynamic range of the modified instrument to 26 dB. For 3 ns pulses, the dynamic range of the modified instrument is 14 dB (instead of 4 dB for the "standard" instrument).

It would, of course, be possible to operate each of fibre amplifiers (no matter how many are present) with bidirectional pumping. Bidirectional pumping for the first of two or more amplifiers is, however, of doubtful value, as there is usually no need for additional power at this stage. Indeed, too much power at such an amplifier can be disadvantageous in that it tends to cause deposits on the PC connectors "downstream" thereof.

Figure 6:
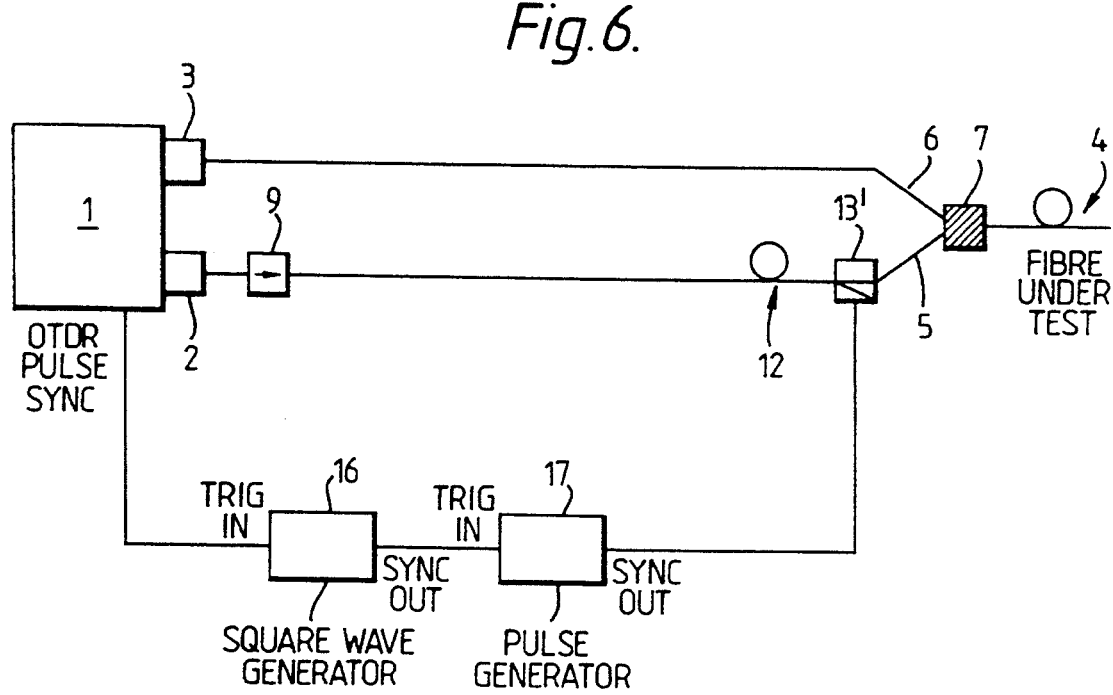
FIG. 6 is a schematic representation of an alternate embodiment of apparatus.

In a further modified arrangement, the acousto-optic switch 13 could be replaced by a semiconductor laser amplifier, and in particular a multiple quantum well device (which can handle the high input power that occur). In this case, the laser amplifier is turned on and off in sychronism with the arrival and departure of light pulses from the OTDR. An advantage of using a laser amplifier in place of the acousto-optic switch is that the gain of a laser amplifier will generally be $\geq 1$, so it constitutes a lossless switch. This is to be compared with a loss of about 7 dB for an acousto-optic switch. This means that the amplification stages upstream of the switch are not so critical. Indeed, if the laser amplifier has sufficient gain, the fibre amplifiers 8 are no longer required, and the laser amplifier acts both as an optical amplifier and an optical switch. Such an arrangement is shown in FIG. 6, in which like reference numerals are used for like parts, and the reference numeral 13' indicates the multiple quantum well semiconductor laser amplifier which constitutes both an optical amplifier and an optical switch. In this case, the square wave generation for 16 is used to trigger the pulse generator 17 which, in turn, triggers the laser amplifier 13'.

It would also be possible to pulse the current to the two pump lasers 11, so that the two fibre amplifiers act as optical switches. Each pump laser 11 would then have its own timing switch constituted by a square wave generator and a pulse generator. This modification should work satisfactorily for wide (−200 ns) pulses, but may encounter problems with narrow pulses (−3 ns). For example, problems may occur in controlling the pump lasers, and with decays after the pump lasers are switched off.

We claim:

1. An optical test apparatus comprising:

an optical time domain reflectometer for launching light pulses into a test fibre,
an optical amplifier disposed in the light path between the optical time domain reflectometer and the test fibre for amplifying the light pulses,
an optical switch also positioned in said light path, and
timing means for synchronising the operation of the optical switch with said light pulses so as substantially to prevent amplified light from reaching the test fibre between the light pulses launched by the OTDR.

2. Apparatus as in claim 1, wherein the optical amplifier includes a fibre amplifier.

3. Apparatus as in claim 1, wherein the optical amplifier includes first and second fibre amplifiers in series.

4. Apparatus as in claim 2, wherein the fibre amplifier includes a length of erbium-doped optical fibre and a pump laser, the pump laser being connected to the length of erbium-doped optical fibre via a wavelength division multiplex coupler.

5. Apparatus as in claim 4, wherein the output of the pump laser is centred on 1,490 nm.

6. Apparatus as in claim 3, wherein:
the first fibre amplifier, which is adjacent to the optical time domain reflectometer, includes a length of erbium-doped optical fibre and a pump laser, the pump laser being connected to the length of erbium-doped optical fibre via a wavelength division multiplex coupler; and
the second fibre amplifier includes a length of erbium-doped optical fibre and two pump lasers, the pump lasers being connected to opposite ends of the length of erbium-doped optical fibre via respective wavelength division multiplex couplers.

7. Apparatus as in claim 6, wherein the output of each of the pump lasers is centred on 1,490 nm, the power of the pump laser associated with the first fibre amplifier is 25 mW, and the power of each of the two pump lasers associated with the second fibre amplifier is 55 mW.

8. Apparatus as in claim 4, wherein the optical amplifier includes first and second fibre amplifiers in series and wherein the erbium-doped optical fibre of the first fibre amplifier has a length of approximately 17 m, a core diameter of approximately 5 $\mu$m and a doping level of approximately 1100 ppm.

9. Apparatus as in claim 4, wherein the erbium-doped optical fibre of the second fibre amplifier has a length of approximately 23 m, a core diameter of approximately 6 $\mu$m and a doping level of approximately 1100 ppm.

10. Apparatus as in claim 3, wherein a lithium niobate switch is positioned in the light path between the two fibre amplifiers.

11. Apparatus as in claim 4, wherein the optical amplifier includes first and second fibre amplifiers in series and wherein each fibre amplifier is associated with a respective optical isolator.

12. Apparatus as in claim 1, wherein the optical switch is positioned in the light path between the optical amplifier and the test fibre.

13. Apparatus as in claim 1, wherein the optical switch includes an acousto-optic switch.

14. Apparatus as in claim 13, wherein the acousto-optic switch is driven by a radio frequency driver whose output frequency is such as to set up an acoustic wave in the switch.

15. Apparatus as in claim 1, wherein the optical switch is a laser amplifier.

16. Apparatus as in claim 15, wherein the laser amplifier is a multiple quantum well device.

17. Apparatus as in claim 15, wherein the laser amplifier constitutes the optical amplifier as well as the optical switch.

18. Apparatus as in claim 1, wherein the synchronising means includes a square wave generator and a pulse generator.

19. Apparatus as in claim 18, wherein the square wave generator and the pulse generator are connected between the optical time domain reflectometer and the optical switch in parallel to an optical signal path also present between the reflectometer and the optical switch, the arrangement being such that the launching of a light pulse by the optical time domain reflectometer along the optical path triggers the square wave generator to output a square wave, the trailing edge of which triggers the pulse generator which, in turn, triggers the optical switch, the period of the square wave being such as to match the delay between the launch of the light pulse by the optical time domain reflectometer and the arrival of that pulse at the optical switch.

20. Apparatus as in claim 19, wherein
the optical switch includes an acousto-optic switch;
the acousto-optic switch being driven by a radio frequency driver whose output frequency is such as to set up an acoustic wave in the switch, and the square wave generator and the pulse generator being connected between the optical time domain reflectometer and the radio frequency driver in parallel to an optical signal path therebetween.

21. Apparatus as in claim 4, wherein a respective timing means is provided for controlling the supply of current to the pump laser, whereby the pump laser operates substantially only when a light pulse is passing through the associated length of erbium-doped optical fibre, and wherein the optical switch is constituted by the fibre amplifier.

22. Apparatus as in claim 21, wherein the timing means includes a square wave generator and a pulse generator, the timing means being such that the launching of a light pulse by the optical time domain reflectometer triggers the respective square wave generator to output a square wave, the trailing edge of which triggers the associated pulse generator which, in turn, triggers the supply of current to the associated pump laser, the period of the square wave being such as to match the delay between the launch of the light pulse by the optical time domain reflectometer and the arrival of that pulse at the associated length of erbium-doped optical fibre.

23. Apparatus as in claim 18, wherein means are provided for continuously varying the width of the output pulse of the pulse generator, whereby the width of the light pulses launched into the test fibre can be continuously varied.

24. Apparatus as in claim 20, further comprising a length of optical fibre positioned in the light path between the amplifier and the acousto-optic switch, the length of said optical fibre being such as to provide a delay in the optical light path between the optical time domain reflectometer and the acousto-optic switch to compensate for electrical delays occurring in the electrical path from the optical time domain reflectometer to the radio frequency driver.

25. An optical test apparatus comprising:

an optical pulse source optically connected via an optical amplifier and an optical switch to a test fibre; and a synchronizing circuit connected to said pulse source and said switch and controllably turning said switch on to pass light signals therethrough to the test fibre only during the occurrence of optical pulses output from said pulse source thereby blocking amplifier-related optical noise from the test fibre at other times.

26. A method for testing a fibre comprising:

generating a light pulse, amplifying said light pulse and passing it through an optical switch to a test fibre; and controlling said optical switch to pass amplified light signals only during the occurrence of a light pulse input to an amplifier thereby blocking amplifier-related optical noise from the test fibre at other times.

* * * * *